(12) United States Patent
Kataoka et al.

(10) Patent No.: US 12,265,310 B2
(45) Date of Patent: Apr. 1, 2025

(54) OPTICAL WAVEGUIDE DEVICE, OPTICAL MODULATOR, OPTICAL MODULATION MODULE, AND OPTICAL TRANSMISSION APPARATUS

(71) Applicant: SUMITOMO OSAKA CEMENT CO., LTD., Tokyo (JP)

(72) Inventors: Yu Kataoka, Tokyo (JP); Kosuke Okahashi, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 221 days.

(21) Appl. No.: 17/699,595

(22) Filed: Mar. 21, 2022

(65) Prior Publication Data

US 2022/0308418 A1 Sep. 29, 2022

(30) Foreign Application Priority Data

Mar. 24, 2021 (JP) .................................. 2021-050409

(51) Int. Cl.
*G02F 1/225* (2006.01)
*G02F 1/21* (2006.01)

(52) U.S. Cl.
CPC ............ *G02F 1/2255* (2013.01); *G02F 1/212* (2021.01)

(58) Field of Classification Search
CPC ...... G02F 1/2255; G02F 1/212; G02F 1/0356; G02F 1/0316; G02F 1/011; G02F 1/0102
See application file for complete search history.

(56) References Cited

U.S. PATENT DOCUMENTS

| | | | |
|---|---|---|---|
| 9,817,294 B2* | 11/2017 | Goi | G02F 1/025 |
| 10,247,999 B1 | 4/2019 | Yap et al. | |
| 10,473,998 B2* | 11/2019 | Sugamata | G02F 1/0327 |
| 10,684,530 B1* | 6/2020 | Bian | G02F 1/29 |
| 2006/0023288 A1* | 2/2006 | McBrien | G02F 1/0356 |
| | | | 359/245 |
| 2014/0233878 A1 | 8/2014 | Goi et al. | |
| 2023/0367169 A1* | 11/2023 | Okahashi | G02F 1/225 |

FOREIGN PATENT DOCUMENTS

| | | |
|---|---|---|
| JP | 11-064664 | 3/1999 |
| JP | 2016-18005 A | 2/2016 |
| JP | 2021-26165 A | 2/2021 |
| WO | 2018/031916 | 2/2018 |

* cited by examiner

*Primary Examiner* — Michelle R Connelly
*Assistant Examiner* — Kirsten D. Endresen
(74) *Attorney, Agent, or Firm* — Rankin, Hill & Clark LLP

(57) ABSTRACT

An optical waveguide device includes a substrate, an optical waveguide formed on the substrate, two electrodes disposed at positions sandwiching the optical waveguide from both sides in a plane of the substrate; and a dielectric layer covering a top of the optical waveguide, wherein the dielectric layer extends in a width direction of the optical waveguide to an extent including edges of the two electrodes, facing the optical waveguide, and is disposed to partially cover each of the two electrodes.

11 Claims, 12 Drawing Sheets

B PORTION DETAILS

OPTICAL WAVEGUIDE DEVICE, OPTICAL MODULATOR, OPTICAL MODULATION MODULE, AND OPTICAL TRANSMISSION APPARATUS

CROSS-REFERENCE TO RELATED APPLICATIONS

This application claims the benefit of Japanese Patent Application No. 2021-050409 filed Mar. 24, 2021, the disclosure of which is herein incorporated by reference in its entirety.

BACKGROUND OF THE INVENTION

Field of the Invention

The present invention relates to an optical waveguide device, an optical modulator, an optical modulation module, and an optical transmission apparatus.

Description of Related Art

In a commercial optical fiber communication system, an optical modulator incorporating an optical modulation element as an optical waveguide device including an optical waveguide formed on a substrate and a control electrode for controlling a light wave propagating in the optical waveguide is often used. Among the optical modulation elements, an optical modulation element using $LiNbO_3$ (hereinafter, also referred to as LN) having an electro-optic effect for a substrate can achieve wide-band optical modulation characteristics with less optical loss, so that it is widely used in optical fiber communication systems for high-speed, large-capacity backbone optical transmission networks and metro networks.

As one measure for downsizing, widening the bandwidth, and saving power of such an optical modulation element, for example, an optical modulator using a rib-type optical waveguide or a ridge optical waveguide formed on the surface of a thin-film LN substrate (for example, a thickness of 20 μm or less) is being put into practical use (for example, Pamphlet of International Publication No. WO2018/031916). The rib-type optical waveguide or the ridge optical waveguide is a protruding optical waveguide configured by forming a band-shaped protruding portion on the thinned LN substrate. As a result, the interaction between the waveguide light propagating in the convex waveguide and the signal electric field generated in the substrate by the control electrode is strengthened (that is, the electric field efficiency is increased), and the miniaturization, broadband and power saving of the optical modulation element are achieved.

One of the problems in such a protruding optical waveguide is the scattering loss of waveguide light due to the surface degradation of the protruding portion formed on the LN substrate. For example, a protruding optical waveguide is formed by etching the surface of an LN substrate, leaving a protruding portion (that is, a core portion that guides light) that becomes an optical waveguide. In this case, depending on the etching rate, the etching temperature, or the like, surface degradation due to minute irregularities may occur on the side surface of the protruding portion formed on the LN substrate. Then, due to the surface degradation of such a protruding portion, a scattering loss may occur in the light propagating through the protruding optical waveguide.

As a technique for reducing the scattering loss caused by the surface degradation of the convex waveguide, it is known that a clad layer made of lithium tantalum niobate is formed by a sol-gel method so as to cover the protruding optical waveguide on the LN substrate (Japanese Laid-open Patent Publication No. 1999-64664). In this configuration, the difference in refractive index between the protruding portion (core) of the convex waveguide and the clad is smaller, as compared with the case where the environmental atmosphere of the protruding optical waveguide is clad, and the scattering loss is effectively reduced.

However, in the configuration in the related art, the clad layer is formed in a portion other than the protruding optical waveguide on the LN substrate. Therefore, the control electrodes disposed at positions sandwiching the protruding optical waveguide after that are formed on the clad layer formed on the LN substrate, so that the strength of the electric field generated in the protruding optical waveguide is weaker as compared to the configuration in which the control electrodes are formed directly on the LN substrate. Along with this, the electric field efficiency of the optical waveguide device may decrease.

As a method of avoiding such a decrease in the electric field strength and maintaining the electric field efficiency, it is also conceivable to remove the area of the clad formed on the LN substrate other than the portion covering the protruding optical waveguide by patterning before formation of the control electrodes. However, in this method, for example, the clad layer is patterned by avoiding the portion in which the control electrodes are disposed, formed by sandwiching a protruding optical waveguide having a width of 2 μm at an clearance of 4 μm, which is technically difficult and can also affect the manufacturing yield.

SUMMARY OF THE INVENTION

From the above background, it is desired that the optical waveguide device effectively prevents the scattering loss of the waveguide light due to the surface roughness of the protruding optical waveguide while maintaining the high electric field efficiency.

According to one aspect of the present invention, there is provided an optical waveguide device including: a substrate; an optical waveguide formed on the substrate; two electrodes disposed at positions sandwiching the optical waveguide from both sides in the plane of the substrate; and a dielectric layer covering a top of the optical waveguide, wherein the dielectric layer extends in a width direction of the optical waveguide to an extent including edges of the two electrodes, facing the optical waveguide, and is disposed to partially cover each of the two electrodes.

According to another aspect of the present invention, the optical waveguide may be a protruding optical waveguide including a protruding portion extending on the substrate.

According to another aspect of the present invention, a refractive index of the dielectric layer may be 0.5 times or more and 0.75 times or less a refractive index of a core portion of the optical waveguide through which light propagates.

According to still another aspect of the present invention, a height of the dielectric layer between the two electrodes may be lower than a height of the portion covering the electrodes.

According to still another aspect of the invention, the dielectric layer may be a resin.

According to another aspect of the present invention, the two electrodes may be configured to be stepped thick as a distance from the optical waveguide increases, and the dielectric layer may extend to an extent including an edge of a first stage closest to each of the two electrodes in the optical waveguide, in a width direction of the optical waveguide, and may be disposed to partially cover each of the two electrodes.

According to another aspect of the present invention, the dielectric layer may be disposed to partially cover each of the first stages of the two electrodes.

According to another aspect of the invention, a clearance between the edges of the two electrodes may be less than 10 µm.

According to another aspect of the present invention, the optical waveguide may configure two parallel waveguides of a Mach-Zehnder type optical waveguide.

Another aspect of the present invention is an optical modulator including: the optical waveguide device according to any one of claims 1 to 9, which is an optical modulation element that modulates light; a case that houses the optical waveguide device; an optical fiber that input light to the optical waveguide device; and an optical fiber that guides light output by the optical waveguide device to outside of the case.

Another aspect of the present invention is an optical modulation module including: the optical waveguide device according to any one of claims 1 to 9, which is an optical modulation element that modulates light; a case that houses the optical waveguide device; an optical fiber that input light to the optical waveguide device; an optical fiber that guides light output by the optical waveguide device to outside of the case; and a drive circuit that drives the optical waveguide device.

Yet another aspect of the present invention is an optical transmission apparatus including: the optical modulator or the optical modulation module; and an electronic circuit that generates an electrical signal for causing the optical waveguide device to perform a modulation operation.

According to the present invention, in an optical waveguide device, it is possible to effectively prevent scattering loss of waveguide light due to surface roughness in a protruding optical waveguide while maintaining high electric field efficiency.

DETAILED DESCRIPTION OF THE INVENTION

First Embodiment

Hereinafter, embodiments of the present invention will be described with reference to the drawings.

Figure 1:
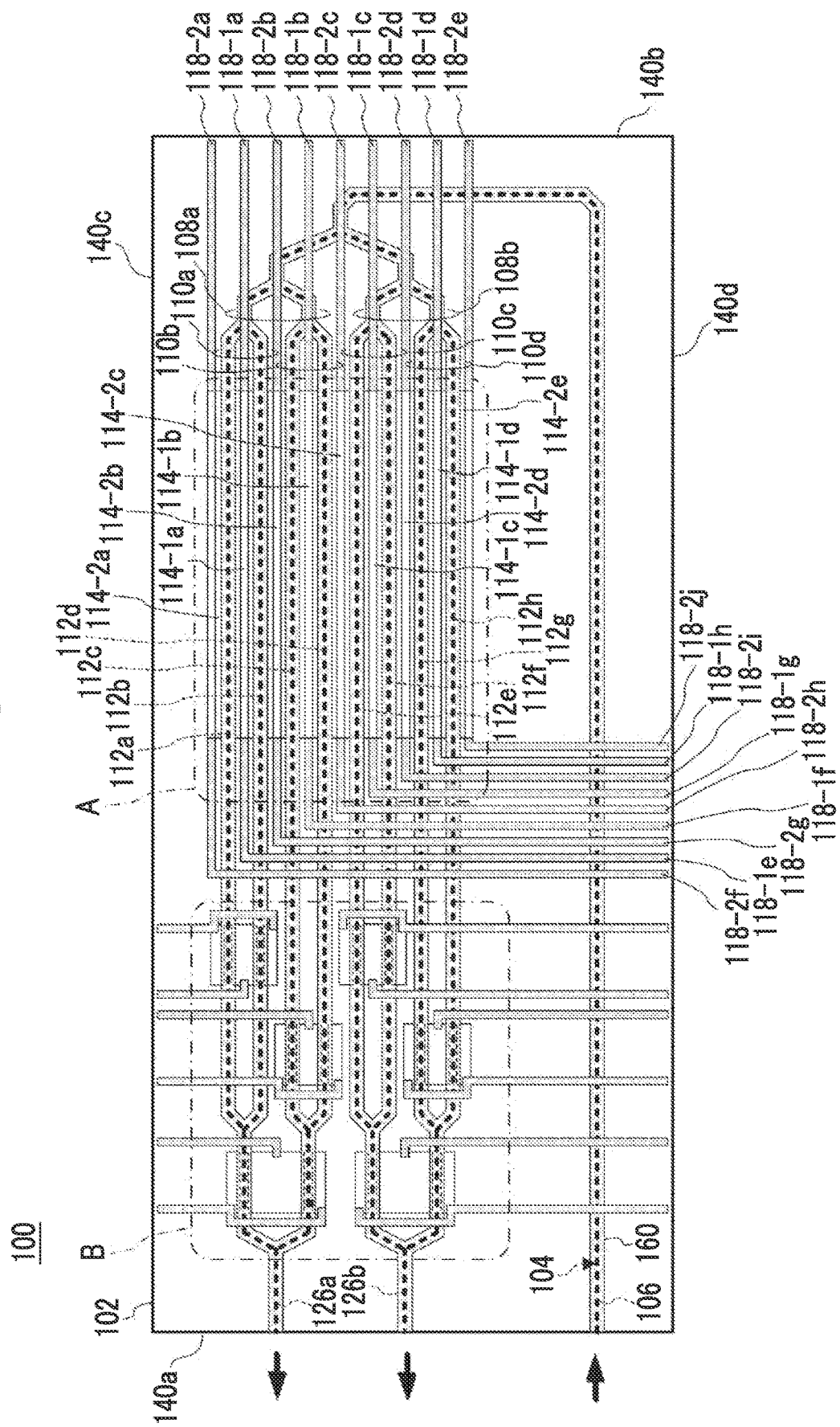
FIG. 1 is a diagram showing a configuration of an optical modulation element according to a first embodiment of the present invention.
Figure 2:
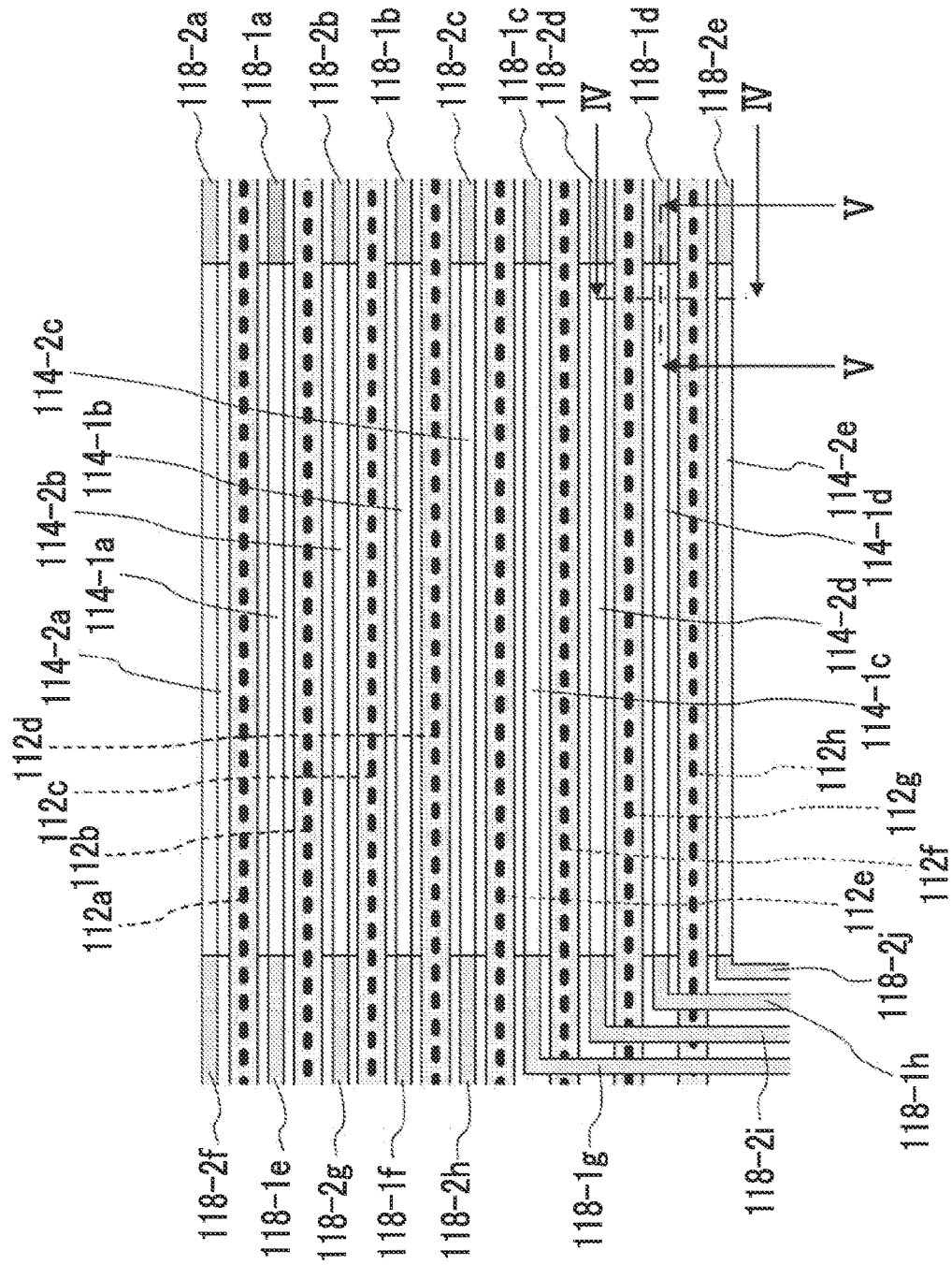
FIG. 2 is a partial detailed view of part A shown in FIG. 1.
Figure 3:
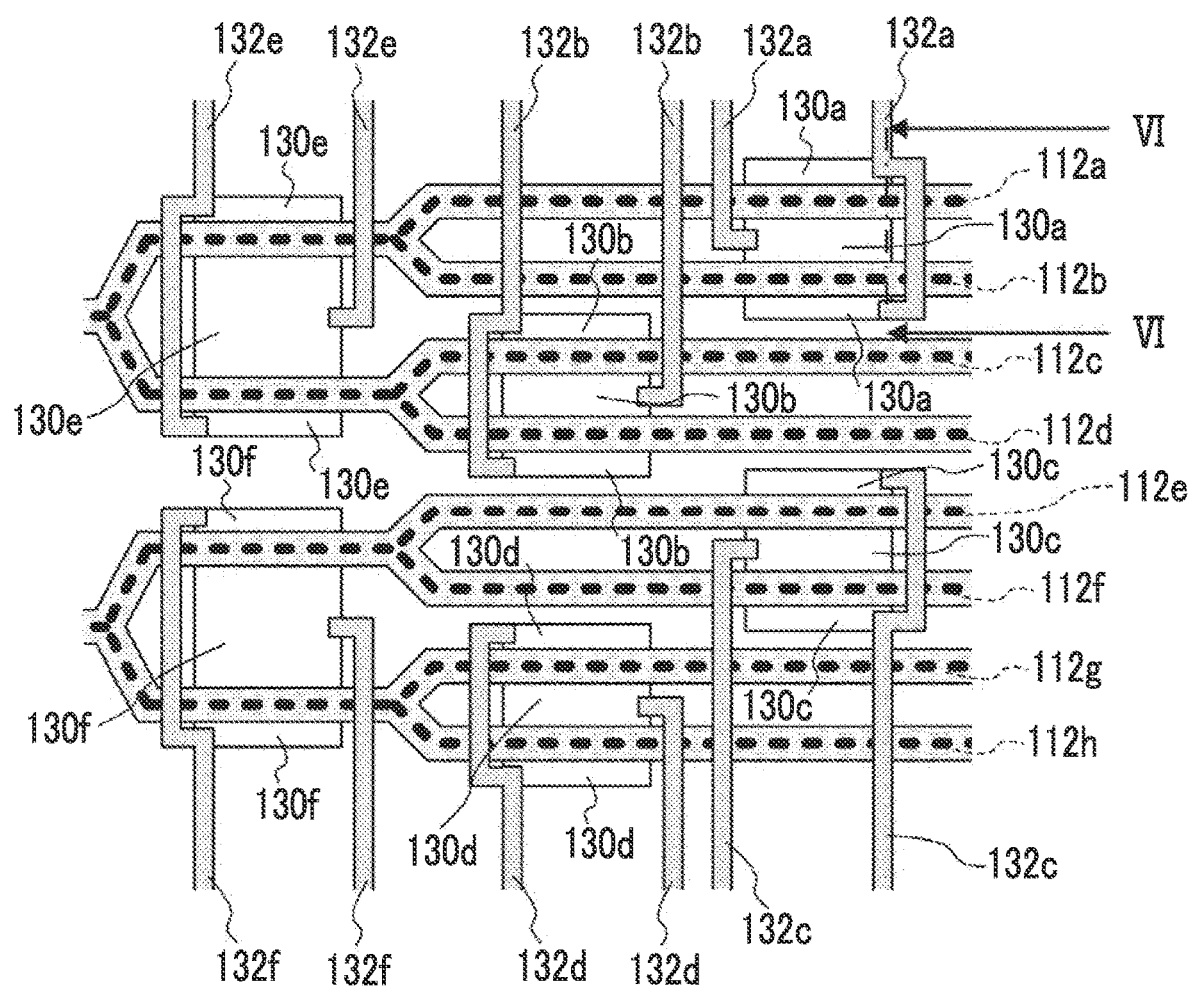
FIG. 3 is a partial detailed view of part B shown in FIG. 1.

FIG. 1 is a diagram showing a configuration of an optical modulation element 100, which is an optical waveguide device according to a first embodiment of the present invention. FIG. 2 is a partial detailed view of part A shown in FIG. 1, and FIG. 3 is a partial detailed view of part B shown in FIG. 1.

The optical modulation element 100 includes an optical waveguide 104 formed on the substrate 102. The substrate 102 is, for example, a thinned X-cut LN substrate having an electro-optic effect, which is processed to a thickness of 20 µm or less (for example, 2 µm). The optical waveguide 104 is a protruding optical waveguide (for example, a rib-type optical waveguide or a ridge optical waveguide) including a band-shaped extending protruding portion formed on the surface of the thinned substrate 102.

The protruding portion extending on the substrate 102 and configuring the optical waveguide 104 is covered with a dielectric layer 160 having a refractive index of more than 1. The dielectric layer 160 can be formed of an inorganic material such as SiO2 by a sputtering method or a CVD method. In particular, in the optical modulation element 100 according to the present embodiment, the dielectric layer 160 is made of a resin. The resin configuring the dielectric layer 160 may be, for example, a photoresist containing a coupling agent (crosslinking agent), and may be a so-called photosensitive permanent film in which the crosslinking reaction proceeds by heat and is cured. However, the dielectric layer 160 is not limited to the photosensitive permanent film, and may be any resin such as a polyamide resin, a melamine resin, a phenol resin, an amino resin, and an epoxy resin having a predetermined refractive index.

The substrate 102 is, for example, rectangular and has two left and right sides 140a and 140b extending in the vertical direction and facing each other, and upper and lower sides 140c and 140d in the figure extending in the left and right direction and facing each other.

The input light (an arrow pointing the right side) input to the input waveguide 106 of the optical waveguide 104 on the lower side of the left side 140a of the substrate 102 is folded back by 180 degrees in the light propagation direction and is branched into two light beams, and the light beams are QPSK-modulated by two nested Mach-Zehnder type optical waveguides 108a and 108b, respectively. The two QPSK-modulated light beams are output from the upper side of the left side 140a of the substrate 102 via the output waveguides 126a and 126b on the left side, respectively (two arrows pointing the left side).

These two output light beams are output from the substrate 102, polarized and combined, for example, by a polarization beam combiner into one optical beam, and transmitted to a transmission optical fiber as a DP-QPSK-modulated optical signal.

The nested Mach-Zehnder type optical waveguide 108a includes two Mach-Zehnder type optical waveguides 110a and 110b. Further, the nested Mach-Zehnder type optical waveguide 108b includes two Mach-Zehnder type optical waveguides 110c and 110d.

The Mach-Zehnder type optical waveguides 110a and 110b have two parallel waveguides 112a, 112b and 112c, 112d, respectively. Further, the Mach-Zehnder type optical waveguides 110c and 110d have two parallel waveguides 112e, 112f and 112g, 112h, respectively.

For QPSK modulation in the nested Mach-Zehnder type optical waveguide 108a, signal electrodes 114-1a and 114-1b (white rectangular portions) to which high-frequency electrical signals for modulation are input are disposed between the two parallel waveguides 112a and 112b of the Mach-Zehnder type optical waveguide 110a and between the two parallel waveguides 112c and 112d of the Mach-Zehnder type optical waveguide 110b, respectively.

Further, for QPSK modulation in the nested Mach-Zehnder type optical waveguide 108b, signal electrodes 114-1c and 114-1d into which high-frequency electrical signals for modulation are input are disposed between the two parallel waveguides 112e and 112f of the Mach-Zehnder type optical waveguide 110c, and between the two parallel waveguides 112g and 112h of the Mach-Zehnder type optical waveguide 110d, respectively.

The signal electrode 114-1a configures a coplanar type transmission line together with the ground electrodes 114-2a and 114-2b (white portions) facing each other across the parallel waveguides 112a and 112b, respectively, and the signal electrode 114-1b configures a coplanar type transmission line together with the ground electrodes 114-2b and 114-2c facing each other across the parallel waveguides 112c and 112d, respectively.

The signal electrode 114-1c configures a coplanar type transmission line together with the ground electrodes 114-2c and 114-2d facing each other across the parallel waveguides 112e and 112f, respectively, and the signal electrode 114-1d configures a coplanar type transmission line together with the ground electrodes 114-2d and 114-2e facing each other across the parallel waveguides 112e and 112f, respectively.

Hereinafter, the nested Mach-Zehnder type optical waveguides 108a and 108b are collectively referred to as nested Mach-Zehnder type optical waveguides 108. Further, the Mach-Zehnder type optical waveguides 110a, 110b, 110c, 110d, 110e, 110f, 110g, 110h are collectively referred to as Mach-Zehnder type optical waveguides 110. Further, the parallel waveguides 112a, 112b, 112c, 112d, 112e, 112f, 112g, 112h are collectively referred to as parallel waveguides 112. Further, the signal electrodes 114-1a, 114-1b, 114-1c, and 114-1d are collectively referred to as signal electrodes 114-1. Further, the ground electrodes 114-2a, 114-2b, 114-2c, 114-2d, and 114-2e are collectively referred to as ground electrodes 114-2.

Further, the signal electrode 114-1 and the ground electrode 114-2 are collectively referred to as working electrodes 114. The signal electrode 114-1 and the ground electrode 114-2, which are the working electrodes 114, control the light wave propagating in the optical waveguide 104. Further, the signal electrode 114-1 and the ground electrode 114-2 are two working electrodes 114 that sandwich the parallel waveguide 112 of the optical waveguide 104 in the plane of the substrate 102.

In the present embodiment, each of the signal electrode 114-1 and the ground electrode 114-2, which are the working electrodes 114, is a two stage electrode, and is configured to be stepped thick as the distance from the parallel waveguide 112 sandwiched by the working electrodes increases (see FIG. 4 below).

The right end portions of the signal electrodes 114-1a, 114-1b, 114-1c, and 114-1d are connected to the signal wiring electrodes 118-1a, 118-1b, 118-1c, and 118-1d (hatched strip portions), respectively. Further, the left end portions of the signal electrodes 114-1a, 114-1b, 114-1c, and 114-1d are connected to the signal wiring electrodes 118-1e, 118-1f, 118-1g, and 118-1h, respectively.

The right ends of the ground electrodes 114-2a, 114-2b, 114-2c, and 114-2d are connected to the ground wiring electrodes 118-2a, 118-2b, 118-2c, and 118-2d, respectively. The left ends of the ground electrodes 114-2a, 114-2b, 114-2c, and 114-2d are connected to the ground wiring electrodes 118-2f, 118-2g, 118-2h, and 118-2i, respectively.

The ground electrode 114-2e is connected to the rectangular ground pattern, a portion including the upper edge extending to the right side of the rectangular ground pattern configures the ground wiring electrode 118-2e, and a portion including the left edge extending to the lower side configures the ground wiring electrode 118-2j.

Thus, the signal wiring electrodes 118-1a, 118-1b, 118-1c, and 118-1d and the ground wiring electrodes 118-2a, 118-2b, 118-2c, 118-2d, and 118-2e adjacent to these signal wiring electrodes configure a coplanar type transmission line. Similarly, the signal wiring electrodes 118-1e, 118-1f, 118-1g, and 118-1h and the ground wiring electrodes 118-2f, 118-2g, 118-2h, 118-2i, and 118-2j adjacent to the signal wiring electrodes configure a coplanar type transmission line.

The signal wiring electrodes 118-1e, 118-1f, 118-1g, and 118-1h extending to the lower side 140d of the substrate 102 are terminated by a termination resistor having a predetermined impedance outside the substrate 102.

Thus, the high-frequency electrical signal input from the signal wiring electrodes 118-1a, 118-1b, 118-1c, and 118-1d extending to the right side 140b of the substrate 102 becomes a traveling wave to propagate through the signal electrodes 114-1a, 114-1b, 114-1c, and 114-1d, and modulates the light wave propagating through the Mach-Zehnder type optical waveguides 110a, 110b, 110c, and 110d, respectively.

Hereinafter, the signal wiring electrodes 118-1a, 118-1b, 118-1c, 118-1d, 118-1e, 118-1f, 118-1g, and 118-1h are collectively referred to as signal wiring electrodes 118-1. Further, the ground wiring electrodes 118-2a, 118-2b, 118-2c, 118-2d, 118-2e, 118-2f, 118-2g, 118-2h, 118-2i, and 118-2j are collectively referred to as ground wiring electrodes 118-2. Further, the signal wiring electrode 118-1 and the ground wiring electrode 118-2 are collectively referred to as wiring electrodes 118. That is, the signal wiring electrode 118-1 and the ground wiring electrode 118-2 are wiring electrodes 118 connected to the working electrode 114.

With reference to FIG. 3, the B portion of the substrate 102 shown in FIG. 1 is provided with bias electrodes 130a, 130b, 130c, and 130d for adjusting the bias points of the Mach-Zehnder type optical waveguides 110a, 110b, 110c, and 110d, and bias electrodes 130e and 130f for adjusting the bias points of the nested Mach-Zehnder type optical waveguides 108a and 108b. The bias electrodes 130a, 130b, and 130e are connected to bias wiring electrodes 132a, 132b, and 132e extending to the upper side 140c of the substrate 102, respectively. Further, the bias electrodes 130c, 130d, and 130f are connected to the bias wiring electrodes 132c, 132d, and 132f extending to the lower side 140d of the substrate 102, respectively.

Hereinafter, the bias electrodes 130a, 130b, 130c, 130d, 130e, and 130f are collectively referred to as bias electrodes 130. Bias wiring electrodes 132a, 132b, 132c, 132d, 132e, and 132f are collectively referred to as bias wiring electrodes 132. In the present embodiment, the bias electrode 130 is also a two-stage electrode like the working electrode 114 described above (see FIG. 6 described later).

As described above, the optical modulation element 100 includes the substrate 102, the optical waveguide 104 formed on the substrate 102, two electrodes disposed at positions sandwiching a part of the parallel waveguide 112 included in the optical waveguide 104 from both sides in the plane of the substrate 102, and a dielectric layer 160 covering a top of the optical waveguide 104. Here, the above two electrodes are, for example, a working electrode 114 and/or a bias electrode 130 that sandwich the parallel waveguide 112.

In particular, in the optical modulation element 100 of the present embodiment, the dielectric layer 160 extends to the extent including the edges of the two working electrodes 114 and the bias electrode 130, facing the parallel waveguide 112, in the width direction of the parallel waveguide 112, and is disposed to partially cover each of the two working electrodes 114 and the bias electrode 130.

Figure 4:
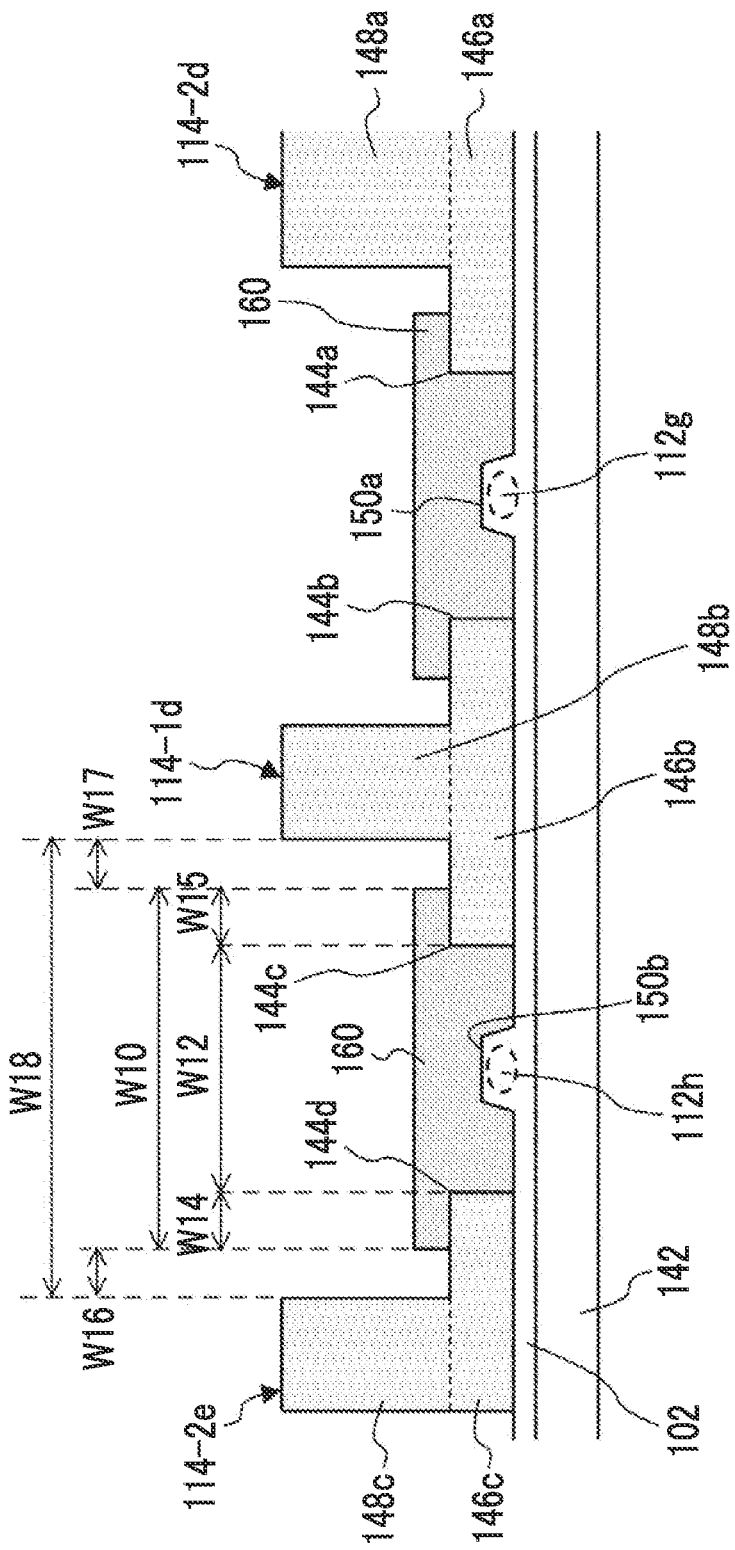
FIG. 4 is a cross-sectional view of part A shown in FIG. 2 taken along line IV-IV.

FIG. 4 is a cross-sectional view taken along line IV-IV in FIG. 2, showing the arrangement of the ground electrode 114-2e, the signal electrode 114-1d, and the ground electrode 114-2d sandwiching the parallel waveguides 112h and 112g. The back surface (lower surface in FIG. 4) of the substrate 102 is supported and reinforced by the supporting plate 142. The supporting plate 142 is, for example, glass. Parallel waveguides 112g and 112h are formed on the upper surface of the substrate 102, as protruding optical waveguides by the protruding portions 150a and 150b formed on the substrate 102, respectively.

On the substrate 102, a ground electrode 114-2d and a signal electrode 114-1d are formed at positions sandwiching the parallel waveguide 112g in the plane of the substrate 102. Further, a signal electrode 114-1d and a ground electrode 114-2e are formed at positions sandwiching the parallel waveguide 112h in the plane of the substrate 102.

A dielectric layer 160 covering the parallel waveguide 112g is disposed between the ground electrode 114-2d and the signal electrode 114-1d. Similarly, a dielectric layer 160 covering the parallel waveguide 112h is disposed between the signal electrode 114-1d and the ground electrode 114-2e.

The dielectric layer 160 between the ground electrode 114-2d and the signal electrode 114-1d extends to the extent including the edges 144a and 144b of the ground electrode 114-2d and the signal electrode 114-1d, facing the parallel waveguide 112g, in the width direction (left and right direction) of the parallel waveguide 112g, and is disposed to partially cover each of the ground electrode 114-2d and the signal electrode 114-1d.

Further, the dielectric layer 160 between the signal electrode 114-1d and the ground electrode 114-2e extends to the left and right to the extent including the edges 144c and 144d of the signal electrode 114-1d and the ground electrode 114-2e, facing the parallel waveguide 112h, in the width direction (left and right direction) of the parallel waveguide 112h, and is disposed to partially cover each of the signal electrode 114-1d and the ground electrode 114-2e.

Here, the ground electrode 114-2d, the signal electrode 114-1d, and the ground electrode 114-2e include the first-stage electrodes 146a, 146b, 146c and the second-stage electrodes 148a, 148b, 148c, respectively. The above-described edges 144a, 144b, 144c, 144d are edges of the first-stage electrodes 146a, 146b, and 146c of the corresponding ground electrode 114-2d, the signal electrode 114-1d, and the ground electrode 114-2e, respectively.

In particular, in the present embodiment, the dielectric layer 160 covering the parallel waveguide 112g is disposed to partially cover the first-stage electrode 146a of the ground electrode 114-2d and the first-stage electrode 146b of the signal electrode 114-1d, respectively. Similarly, the dielectric layer 160 covering the parallel waveguide 112h is disposed to partially cover the first-stage electrode 146b of the signal electrode 114-1d and the first-stage electrode 146c of the ground electrode 114-2e.

Thereby, for example, on the left and right sides of the dielectric layer 160 covering the parallel waveguide 112h, a gap of a width W16 is formed between the dielectric layer 160 and the second-stage electrode 148c of the ground electrode 114-2e, and a gap of a width W17 is formed between the dielectric layer 160 and the second-stage electrode 148b of the signal electrode 114-1d. Thereby, for example, between the signal electrode 114-1d and the ground electrode 114-2e, the electric field is concentrated on the dielectric layer 160 between the first-stage electrodes 146b and 146c, compared with the space between the second-stage electrodes 148b and 148c, and thus the electric field efficiency in the parallel waveguide 112h covered by the dielectric layer 160 is improved.

In the dielectric layer 160, the other parallel waveguides 112a, 112b, 112c, 112d, 112e, and 112f are also configured in the same manner as described above. Here, the edges of the two working electrodes 114 that sandwich the parallel waveguide 112, facing the parallel waveguide 112, are collectively referred to as edges 144. Further, the first-stage electrodes and the second-stage electrodes of the working electrode 114 are collectively referred to as first-stage electrodes 146 and the second-stage electrodes 148, respectively.

That is, the dielectric layer 160 extends to an extent including the edges 144 of the two working electrodes 114 and the bias electrode 130, facing the parallel waveguide 112, in the width direction of the parallel waveguide 112, and is disposed to partially cover each of the first-stage electrodes 146 of the two working electrodes 114.

Here, the clearance between the edges 144 facing each other (for example, the distance W12 between the edges 144c and 144d in FIG. 4) of the two working electrodes 114 sandwiching the parallel waveguide 112 is, for example, less than 10 μm.

Figure 5:
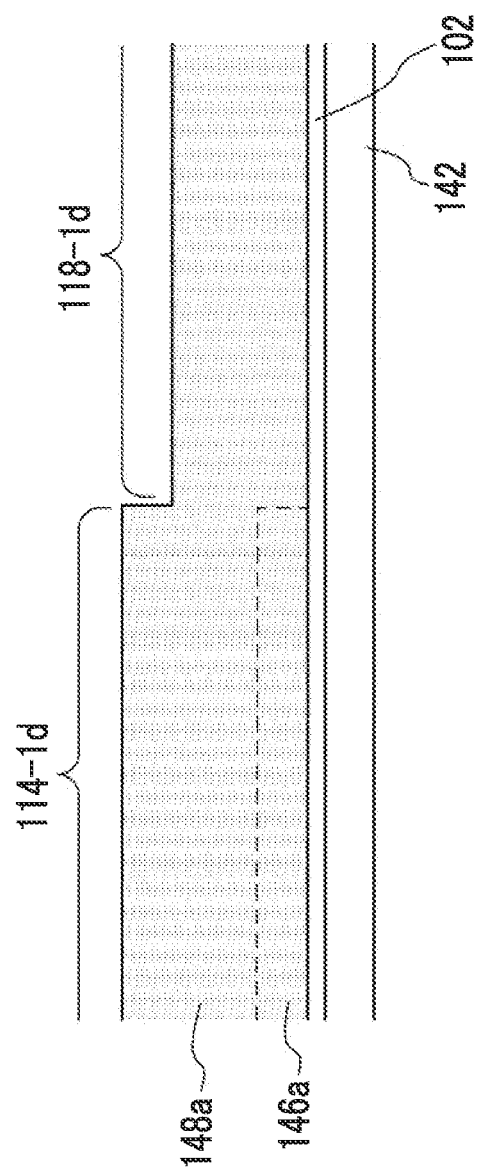
FIG. 5 is a cross-sectional view of the part A shown in FIG. 2 taken along line V-V.

In the present embodiment, the wiring electrode 118 is formed by extending a second-stage portion (that is, a thick portion) of the working electrode 114, which is a two-stage electrode. FIG. 5 is a cross-sectional view taken along line V-V in FIG. 2, showing a connection state between the signal electrode 114-1d and the signal wiring electrode 118-1d, as an example of a connection state between the working electrode 114 and the wiring electrode 118. The signal electrode 114-1d includes a first-stage electrode 146a and a second-stage electrode 148a, and the second-stage electrode 148a of the signal electrode 114-1d extends to the right to configure the signal wiring electrode 118-1d.

In the dielectric layer 160, the bias electrode 130 shown in FIG. 3 is also disposed in the same arrangement as that in the working electrode 114 described above. That is, the two adjacent bias electrodes 130 are configured to sandwich the parallel waveguide 112 in the plane of the substrate 102. Then, the dielectric layer 160 covering the parallel waveguide 112 extends to an extent including the edges of the two bias electrodes 130, facing the parallel waveguide 112, in the width direction of the parallel waveguide 112, and is disposed to partially cover each of the two bias electrodes 130.

Figure 6:
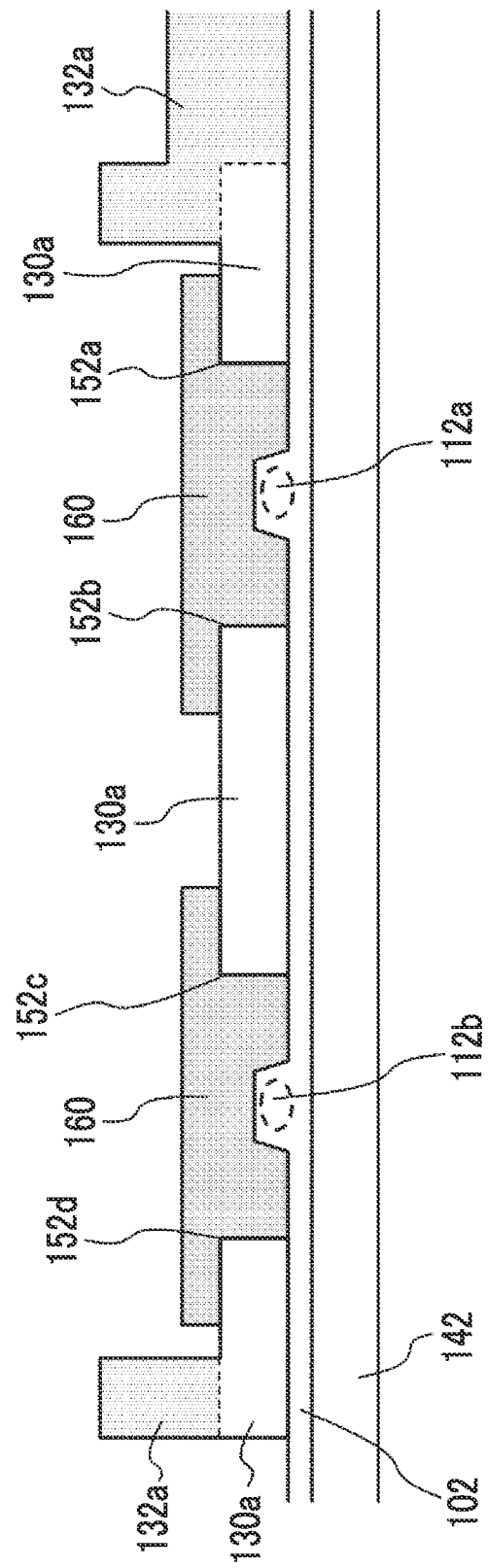
FIG. 6 is a cross-sectional view of part B shown in FIG. 3 taken along line VI-VI.

FIG. 6 is a cross-sectional view taken along line VI-VI in FIG. 3, showing the arrangement of the dielectric layer 160 in the bias electrode 130a as an example of the arrangement of the dielectric layer 160 in the bias electrode 130. The bias electrode 130a is formed on the substrate 102 so as to sandwich each of the parallel waveguide 112a and 112b in the plane of the substrate 102. The dielectric layer 160 covering the parallel waveguide 112a extends to the extent including edges 152a and 152b of the two bias electrodes 130a, facing the parallel waveguide 112a, on the both sides in the width direction (left and right direction) of the parallel waveguide 112a, and is disposed to partially cover each of the bias electrodes 130a. Further, in FIG. 6, the bias wiring electrodes 132a are connected to the left and right bias electrodes 130a.

In the dielectric layer 160, the other bias electrodes 130b, 130c, 130d, 130e, and 130f are also configured in the same manner as described above. Here, the edges of the two bias electrodes 130 that sandwich the parallel waveguide 112, facing the parallel waveguide 112, are collectively referred to as edges 152. That is, the dielectric layer 160 extends to the extent including the edge 152 of each of the two bias electrode 130, facing the parallel waveguide 112, in the width direction of the parallel waveguide 112, and is disposed to partially cover each of the two bias electrodes 130.

In the optical modulation element 100 having the above configuration, the protruding portion extending on the substrate 102 and configuring the optical waveguide 104 is covered with the dielectric layer 160 which is a resin having a refractive index of more than 1. As a result, in the optical modulation element 100, the difference in refractive index between the protruding portion and the surrounding environment of the protruding portion becomes smaller compared with the state where the protruding portion is in contact with air, and scattering loss due to surface degradation in the side surface of the protruding portion generated in the process of forming the protruding portion is reduced.

The dielectric layer 160 can be formed, for example, by coating (spin coating) a photosensitive permanent film, which is a photoresist, on a substrate 102 with a spinner and patterning using ultraviolet rays.

In the optical modulation element 100, the dielectric layer 160 extends to an extent including the edges facing each other of the two working electrodes 114 sandwiching the parallel waveguide 112 and is disposed to partially cover each of the electrodes. Therefore, even when the formation position of the dielectric layer 160 in the plane of the substrate 102 is deviated in the width direction of the parallel waveguide 112 in the manufacturing process (for example, the above patterning step), as long as the deviation amount is within a predetermined error range, the state in which a space between the two working electrodes 114 sandwiching the parallel waveguide 112 is charged with the dielectric layer 160 without a gap can be maintained. Therefore, in the optical modulation element 100, the manufacturing variation of the capacity between the two working electrodes 114 sandwiching the parallel waveguide 112 is reduced, and the electric field applied to the parallel waveguide 112 from the two working electrodes 114 can be maintained high (that is, the electric field efficiency can be maintained high). The same applies to the bias electrode 130.

As a result, in the optical modulation element 100, it is possible to effectively prevent scattering loss of waveguide light due to surface roughness in a protruding optical waveguide while maintaining high electric field efficiency in the optical waveguide 104 (specifically, the portion of the parallel waveguide 112).

The predetermined error range is, for example, a range within the smaller dimension of W14 and W15, in FIG. 4, when the design values of the riding dimensions of the dielectric layer 160 covering the parallel waveguide 112h on the left and right working electrodes 114 (ground electrode 114-2e and signal electrode 114-1d) are W14 and W15. When the center of the width W10 of the upper surface of the dielectric layer 160 and the center of the distance W12 between the left and right working electrodes 114 coincide in design, the error range is (W10-W12)/2.

Further, the working electrodes 114 sandwiching the parallel waveguide 112 is generally formed as thick as about 1 μm in height from the surface of the substrate 102, in an optical modulation element that uses a microwave electrical signal of several GHz as a high-frequency electrical signal for modulation. Therefore, the depth of the recess portion formed between the two working electrodes 114 is as deep as 1 μm. Filling such a deep recess portion with an inorganic dielectric such as silicon dioxide (SiO2) involves technical difficulties. Further, even when such a thick film is formed, the stress accumulated inside the inorganic dielectric layer in the film forming process is applied to the substrate 102 or the like after manufacturing, which may adversely affect the electrical and/or optical characteristics or long-term reliability of the optical modulation element.

As described above, in the optical modulation element 100, since the dielectric layer 160 is made of resin, a thick layer of about 10 μm can be easily formed. Further, since the Young's modulus of the resin is generally smaller than that of the inorganic material, the stress applied from the dielectric layer 160 to the substrate 102 or the like after production is significantly reduced as compared with the case where the inorganic dielectric layer is used.

Further, the viscosity of the resin such as the photosensitive permanent film used for the dielectric layer 160 can be adjusted by adjusting the composition of the resin. By using the dielectric layer 160 which is a resin, it is possible to adjust the thickness of a film to be formed on the substrate 102 during spin coating, by adjusting the viscosity in addition to adjusting the rotation speed of the spinner during spin coating. Therefore, in the optical modulation element 100, the capacity between the two working electrodes 114 can be set to a desired value, by adjusting the thickness of the dielectric layer 160 formed between the two working electrodes 114 sandwiching the parallel waveguide 112, so that the impedance between the two working electrodes 114 can be adjusted, and the velocity matching between the light wave and the high-frequency electrical signal can be adjusted.

Further, the two working electrodes 114 sandwiching the parallel waveguide 112 are two-stage electrodes. Such a multi-stage configuration of the working electrode 114 is generally used to widen the frequency characteristic of the transmission line configured by the working electrode 114 while maintaining a high strength of the electric field generated in the parallel waveguide 112. In particular, in the present embodiment, the dielectric layer 160 covering the parallel waveguide 112 is disposed to extend to the edge of the first-stage electrode closest to the parallel waveguide 112, and partially cover the first-stage electrode. Therefore, the lines of electric force generated between the working electrodes 114 have a higher density in the dielectric layer 160 formed between the first-stage electrodes than in the space between the second-stage electrodes. As a result, in the present embodiment, the electric field is concentrated on the parallel waveguide 112 covered with the dielectric layer 160 between the first-stage electrodes, and the electric field efficiency is improved.

Figure 7:
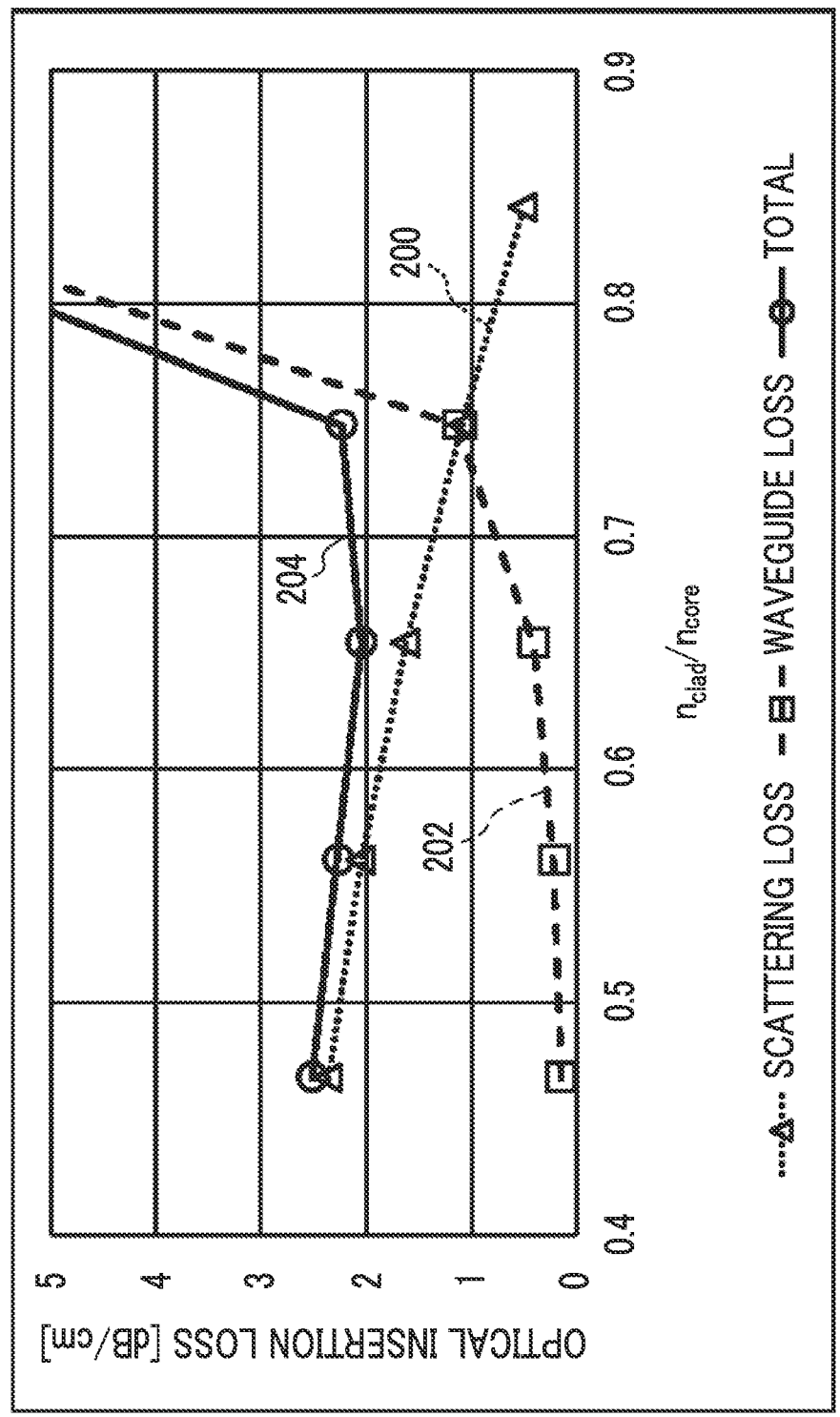
FIG. 7 is a diagram showing a change in a scattering loss of an optical waveguide with respect to a refractive index of a material of a dielectric layer in the optical modulation element shown in FIG. 1.

As described above, in the dielectric layer 160 covering the parallel waveguide 112, by reducing a refractive index difference between the protruding portion on the substrate 102 which is an optical waveguide portion (so-called core) and the dielectric layer 160 which functions as a clad, the scattering loss on the surface of the protruding portion is reduced. FIG. 7 is a diagram showing the effect of reducing the scattering loss with respect to the refractive index of the material configuring the dielectric layer 160. In FIG. 7, the horizontal axis is the ratio (refractive index ratio) nclad/ncore of the refractive index nclad of the dielectric layer 160 with respect to the refractive index ncore of the protruding portion configuring the parallel waveguide 112. The vertical axis indicates the optical loss (dB/cm) in the parallel waveguide 112.

In FIG. 7, a line 200 shows the scattering loss in the parallel waveguide 112. FIG. 7 further shows lines 202 and 204. The line 202 represents a waveguide loss that depends on the optical confinement effect in the parallel waveguide 112. Further, the line 204 represents the total loss including the scattering loss shown by the line 200 and the waveguide loss shown by the line 202.

From the line 200, it can be seen that the closer the refractive index ratio nclad/ncore is to 1, that is, as the difference in refractive index between the refractive index ncore of the protruding portion configuring the parallel waveguide 112 and the refractive index nclad of the dielectric layer 160 becomes small, the scattering loss in the parallel waveguide 112 is reduced.

On the other hand, from the line 202, it can be seen that the waveguide loss of the parallel waveguide 112 increases as the refractive index ratio nclad/ncore approaches 1. This increase in waveguide loss is due to the fact that the optical confinement effect in the parallel waveguide 112 decreases as the refractive index difference decreases, and when the refractive index ratio nclad/ncore exceeds 0.75, the waveguide loss suddenly increases. As a result, as shown in line 204, the total loss of the parallel waveguide 112 changes in a U shape with respect to the refractive index ratio nclad/ncore, and is a minimum value (about 2 dB/cm) at the refractive index ratio nclad/ncore=0.65.

From the line 204, it can be seen that the refractive index ratio nclad/ncore is preferably 0.5 or more and 0.75 or less, assuming that the allowable increase in optical loss from the minimum value is 0.5 dB. That is, it is desirable that the refractive index nclad of the dielectric layer 160 is 0.5 times or more and 0.75 or less of the refractive index ncore of the protruding portion configuring the parallel waveguide 112.

Next, modification examples of the optical modulation element 100 will be described.

First Modification Example

Figure 8:
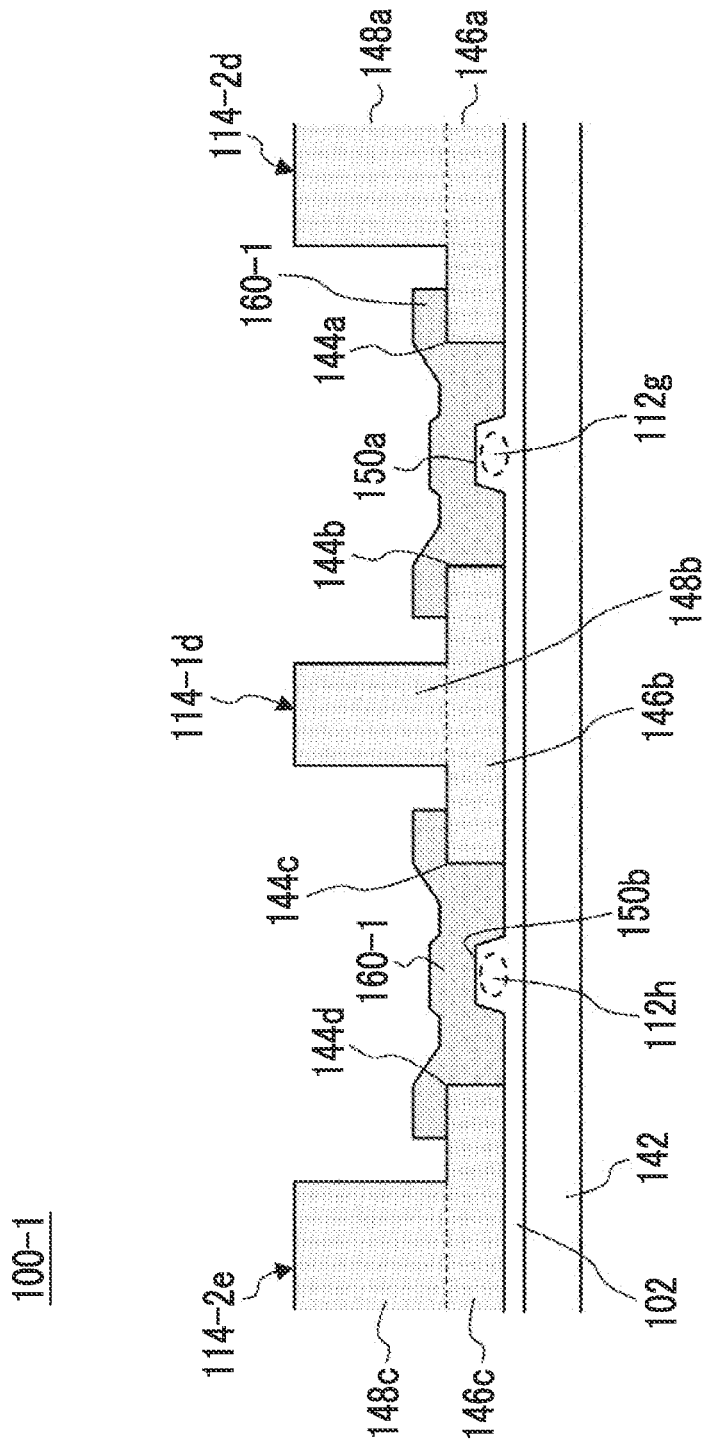
FIG. 8 is a first modification example of the optical modulation element shown in FIG. 1.

FIG. 8 is a diagram showing the configuration of an optical modulation element 100-1 according to a first modification example of the optical modulation element 100, and corresponding to FIG. 4 in the above-described embodiment. The dielectric layer 160-1 shown in FIG. 8 is used in place of the dielectric layer 160 in the optical modulation elements 100 shown in FIGS. 1 to 6. In FIG. 8, for the same components as those shown in FIG. 4, the same reference numerals as those shown in FIG. 4 are used, and the above description for FIG. 4 is used. Further, since the planar configuration of the optical modulation element 100-1 in which the dielectric layer 160-1 is used is the same as the planar configuration of the optical modulation element 100 shown in FIGS. 1 to 3, the above description of FIGS. 1 to 3 is incorporated.

In FIG. 8, the dielectric layer 160-1 has the same structure as the dielectric layer 160 shown in FIG. 4, except that the upper surface is not flat and has irregularities. Specifically, in the dielectric layer 160-1 covering the parallel waveguide 112g, the height between the edge 144a and the edge 144b of the ground electrode 114-2d and the signal electrode 114-1d adjacent to the parallel waveguide 112g is lower than the height of the portion that partially covers the ground electrode 114-2d and the signal electrode 114-1d.

The dielectric layer 160-1 covering the other parallel waveguides 112 may also be configured in the same manner as described above. That is, in the dielectric layer 160-1 covering the parallel waveguide 112, the height between the signal electrode 114-1 and the ground electrode 114-2 sandwiching the parallel waveguide 112 is lower than the height of the portion covering these electrodes.

Such an upper surface shape of the dielectric layer 160-1 can be achieved, for example, by adjusting the viscosity of the resin at the time of spin coating according to the composition of the resin configuring the dielectric layer 160-1.

In general, a resin such as a photosensitive permanent film has viscosity before curing, so that even when the substrate 102 has irregularities due to protruding portions or electrodes configuring the optical waveguide 104, the surface of the resin after spin coating is substantially flat. Further, in the patterning step of the spin-coated resin, when high-temperature treatment for drying or the like is performed, the surface of the spin-coated resin can be further flattened by high-temperature softening of the resin depending on the treatment temperature. Therefore, in general, the upper surface of the dielectric layer 160 between the electrodes sandwiching the parallel waveguide 112 is substantially flat as shown in FIG. 4.

On the other hand, in the configuration shown in FIG. 8, in the dielectric layer 160-1, as described above, the height between the edge 144a and the edge 144b of the ground electrode 114-2d and the signal electrode 114-1d adjacent to the parallel waveguide 112g is lower than the height of the portion covering the ground electrode 114-2d and the signal electrode 114-1d. That is, the dielectric layer 160-1 is configured such that the thickness of the portion covering the parallel waveguide 112 is thinner than the thickness of the parallel waveguide 112 covering the dielectric layer 160 in the configuration shown in FIG. 4. The configuration shown in FIG. 8 can be formed by adjusting the viscosity of the pre-cured resin used in the configuration of FIG. 4. Further, the dielectric layer 160 can be formed by using a sputtering method or a CVD method because it is affected by the irregularities on the substrate 102 due to the protruding portions and electrodes configuring the optical waveguide 104.

As a result, in the present modification example, the lines of electric force between the signal electrode 114-1d and the ground electrode 114-2d are concentrated on and pass through the thinly formed dielectric layer 160-1, compared with the configuration of FIG. 4, the electric field applied to the parallel waveguide 112 is further strengthened, and the electric field efficiency is further improved.

Second Modification Example

Figure 9:
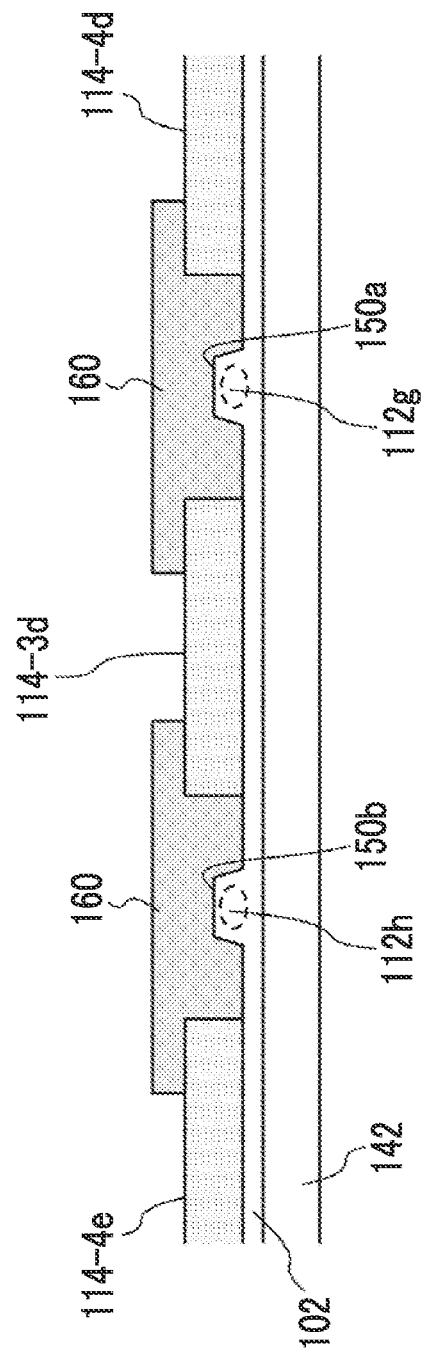
FIG. 9 is a second modification example of the optical modulation element shown in FIG. 1.

FIG. 9 is a diagram showing the configuration of an optical modulation element 100-2 according to a second modification example of the optical modulation element 100, and corresponding to FIG. 4 in the above-described embodiment. The signal electrode 114-3d and the ground electrodes 114-4d and 114-4e shown in FIG. 9 are used in place of the signal electrode 114-1d and the ground electrodes 114-2d and 114-2e in the optical modulation element 100 shown in FIGS. 1 to 4. In FIG. 9, for the same components as those shown in FIG. 4, the same reference numerals as those shown in FIG. 4 are used, and the above description for FIG. 4 is incorporated.

Further, since the planar configuration of the optical modulation element 100-2 in which the signal electrode 114-3d and the ground electrodes 114-4d and 114-4e shown in FIG. 9 are used is the same as the optical modulation element 100 shown in FIGS. 1 to 3, the above-described explanations of FIGS. 1 to 3 are incorporated.

The signal electrode 114-1 and the ground electrode 114-2, which are the working electrodes 114 shown in FIGS. 4 and 8, are configured as two stage electrodes as an example, but these working electrodes may be configured as one stage. The signal electrode 114-3d and the ground electrodes 114-4d and 114-4e shown in FIG. 9 are configured as such one stage electrodes. As in the configuration shown in FIG. 4, the dielectric layer 160 covering the parallel waveguide 112g extends to the extent including the edges of the ground electrode 114-4d and the signal electrode 114-3d sandwiching the parallel waveguide 112g, facing the parallel waveguide 112g, in the width direction (left and right direction) of the parallel waveguide 112g, and is disposed to partially cover each of the ground electrode 114-4d and the signal electrode 114-3d.

Second Embodiment

Figure 10:
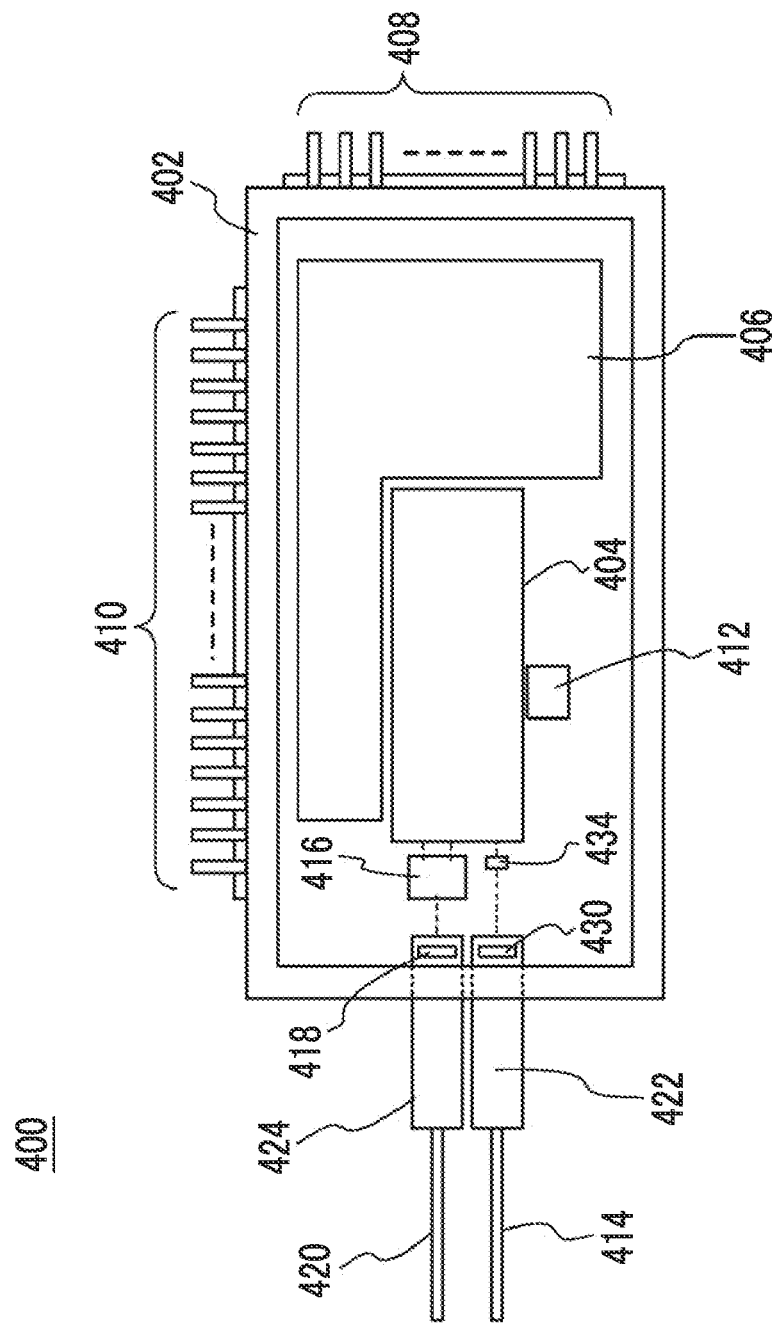
FIG. 10 is a diagram showing a configuration of an optical modulator according to a second embodiment of the present invention.

Next, a second embodiment of the present invention will be described. The present embodiment is an optical modulator using any one of the above-described optical modulation elements. FIG. 10 is a diagram showing the configuration of an optical modulator 400 according to the second embodiment. The optical modulator 400 includes a case 402, an optical modulation element 404 housed in the case 402, and a relay substrate 406. The optical modulation element 404 is any one of the above-described optical modulation elements 100, 100-1, and 100-2. Finally, a cover (not shown), which is a plate body, is fixed to the opening of the case 402, and the inside of the case 402 is hermetically sealed.

The optical modulator 400 has signal pins 408 for inputting a high-frequency electrical signal used for modulation of the optical modulation element 404, and signal pins 410 for inputting an electrical signal used for adjusting the operating point of the optical modulation element 404.

Further, the optical modulator 400 has an input optical fiber 414 for inputting light into the case 402 and an output optical fiber 420 for guiding the light modulated by the optical modulation element 404 to the outside of the case 402, on the same surface of the case 402 (in the present embodiment, the surface on the left side).

Here, the input optical fiber 414 and the output optical fiber 420 are fixed to the case 402 via the supports 422 and 424 which are fixing members, respectively. The light input from the input optical fiber 414 is collimated by the lens 430 disposed in the support 422 and then input to the optical modulation element 404 via the lens 434. However, this is only an example, and the light may be input to the optical modulation element 404, based on the related art, for example, by introducing the input optical fiber 414 into the case 402 via the support 422, and connecting the end surface of the introduced input optical fiber 414 to the end surface of the substrate 102 of the optical modulation element 404.

The light output from the optical modulation element 404 is coupled to the output optical fiber 420 via the optical unit 416 and the lens 418 disposed on the support 424. The optical unit 416 may include a polarization beam combiner that combines two modulated light output from the optical modulation element 404 into a single beam.

The relay substrate 406 relays the high-frequency electrical signal input from the signal pins 408 and the electrical signal for adjusting an operating point (bias point) input from the signal pins 410 to the optical modulation element 404, according to a conductor pattern (not shown) formed on the relay substrate 406. The conductor pattern on the relay substrate 406 is connected to each pad configuring one end of the electrode of the optical modulation element 404 by, for example, wire bonding or the like. Further, the optical modulator 400 includes a terminator 412 having a predetermined impedance in the case 402.

Since the optical modulator 400 having the above configuration is configured by using the optical modulation element 404 which is any of the optical modulation elements 100, 100-1, 100-2 having a configuration capable of effectively preventing the scattering loss of the waveguide light due to the surface roughness in the protruding optical waveguide, it is possible to provide a modulation operation with low optical loss and a low drive voltage.

Third Embodiment

Figure 11:
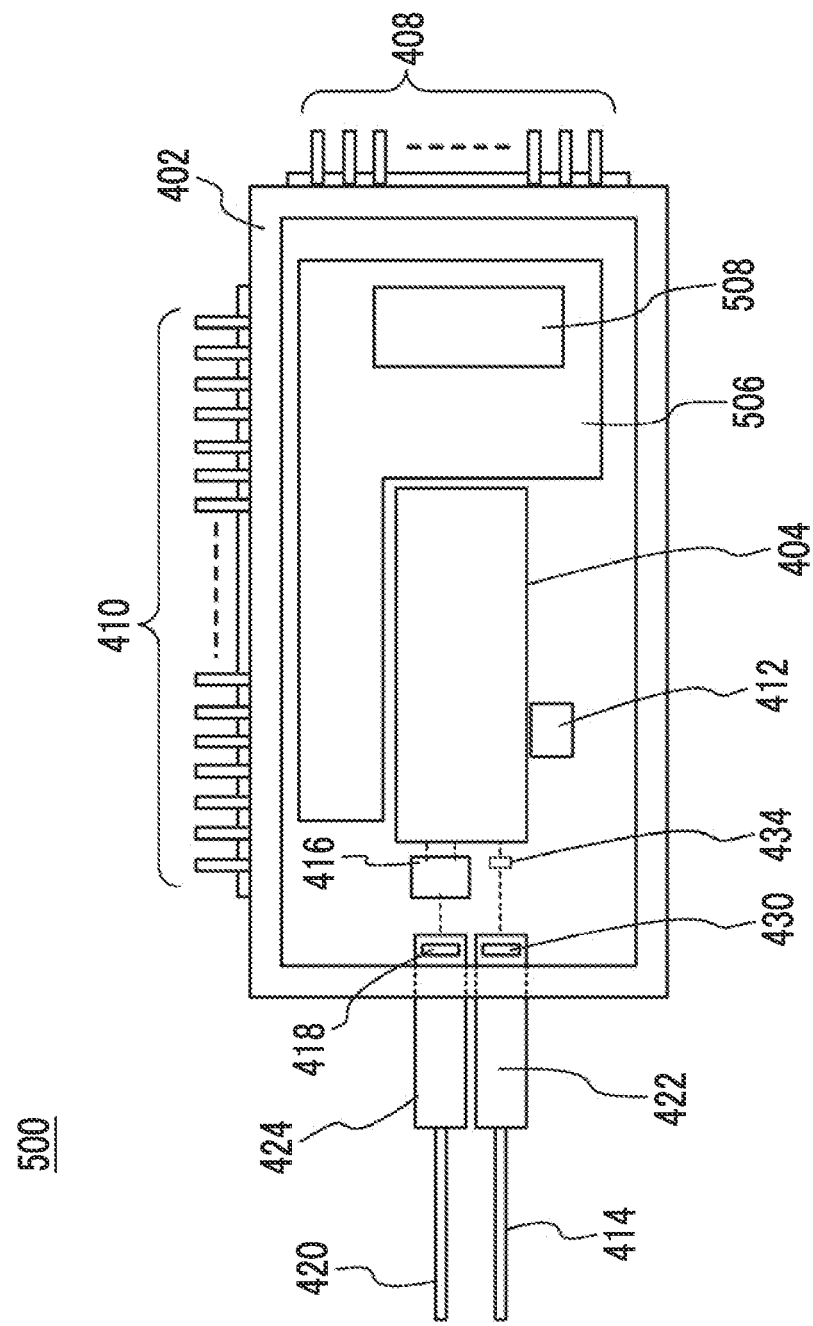
FIG. 11 is a diagram showing a configuration of an optical modulation module according to a third embodiment of the present invention.

Next, a third embodiment of the present invention will be described. The present embodiment is an optical modulation module 500 using the optical modulation element according to any one of the above-described embodiments or modification examples. FIG. 11 is a diagram showing the configuration of an optical modulation module 500 according to the present embodiment. In FIG. 11, for the same components as in the optical modulator 400 according to the second embodiment shown in FIG. 10, the same reference numerals as those shown in FIG. 10 are used, and the above description for FIG. 10 is incorporated.

The optical modulation module 500 has the same configuration as the optical modulator 400 shown in FIG. 8, but differs from the optical modulator 400 in that it includes a circuit substrate 506 instead of the relay substrate 406. The circuit substrate 506 includes a drive circuit 508. The drive circuit 508 generates a high-frequency electrical signal for driving the optical modulation element 404 based on, for example, a modulation signal supplied from the outside via the signal pins 408, and outputs the generated high-frequency electrical signal to the optical modulation element 404.

Since the optical modulation module 500 is configured by using the optical modulation element 404 which is any of the optical modulation elements 100, 100-1, 100-2 having a configuration capable of effectively preventing the scattering loss of the waveguide light due to the surface roughness in the protruding optical waveguide, it is possible to provide a modulation operation with low optical loss and a low drive voltage, similarly to the optical modulator 400 according to the second embodiment described above.

Fourth Embodiment

Figure 12:
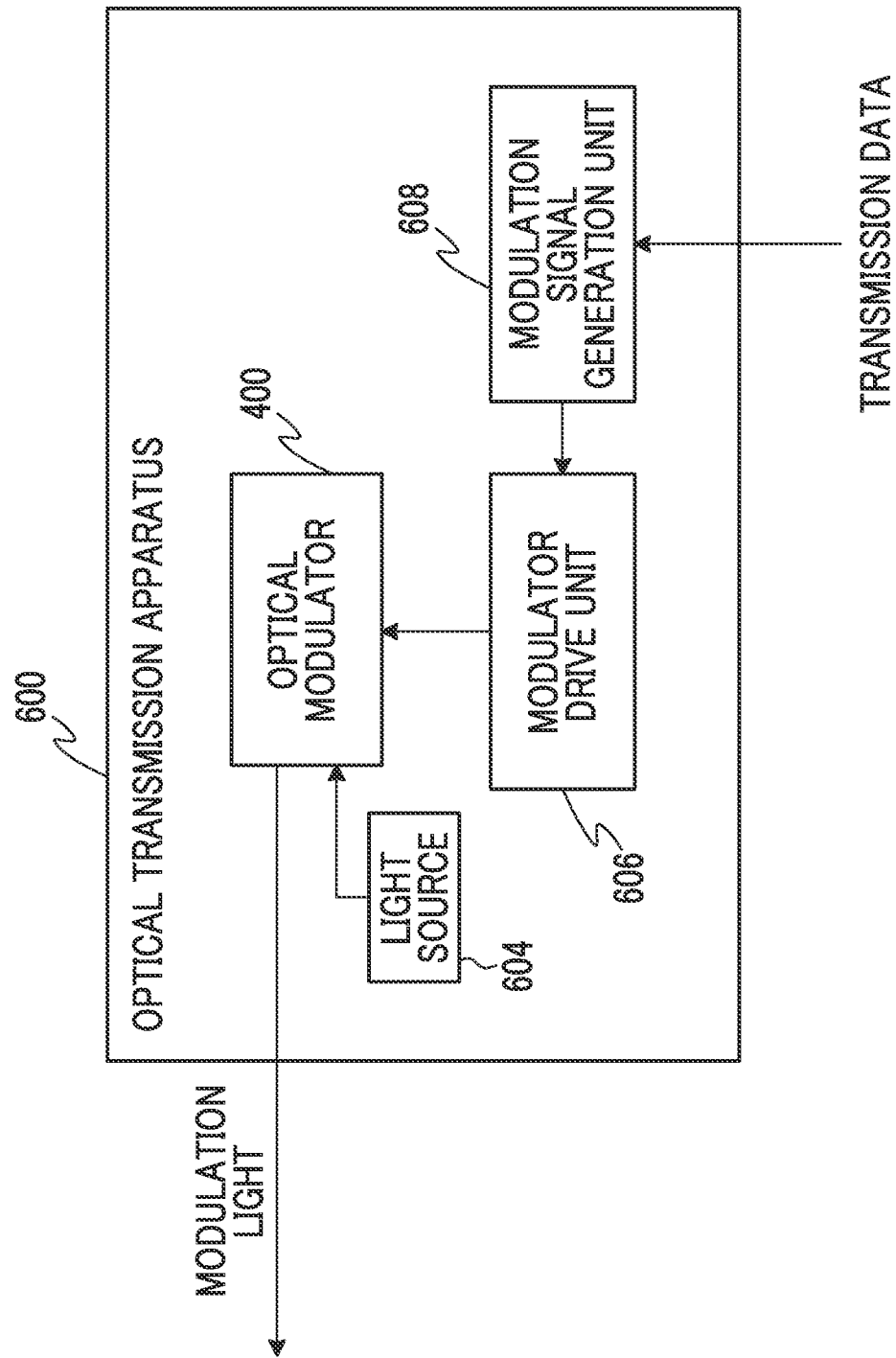
FIG. 12 is a diagram showing a configuration of an optical transmission apparatus according to a fourth embodiment of the present invention.

Next, a fourth embodiment of the present invention will be described. The present embodiment is an optical transmission apparatus 600 equipped with the optical modulator 400 according to the second embodiment. FIG. 12 is a diagram showing a configuration of an optical transmission apparatus 600 according to the present embodiment. The optical transmission apparatus 600 includes an optical modulator 400, a light source 604 that input light to the optical modulator 400, a modulator drive unit 606, and a modulation signal generation unit 608. The above-described optical modulation module 500 can also be used instead of the optical modulator 400 and the modulator drive unit 606.

The modulation signal generation unit 608 is an electronic circuit that generates an electrical signal for causing the optical modulator 400 to perform a modulation operation, which generates, based on transmission data given from the outside, a modulation signal which is a high-frequency signal for causing the optical modulator 400 to perform an optical modulation operation according to the modulation data, and outputs the modulation signal to the modulator drive unit 606.

The modulator drive unit 606 amplifies the modulation signal input from the modulation signal generation unit 608, and outputs a high-frequency electrical signal for driving a signal electrode such as the optical modulation element 100 included in the optical modulator 400. As described above, instead of the optical modulator 400 and the modulator drive unit 606, for example, the optical modulation module 500 provided with a drive circuit 508 including a circuit corresponding to the modulator drive unit 606 inside the case 402 can also be used.

The high-frequency electrical signal is input to the signal pins 408 of the optical modulator 400 to drive the optical modulation element 100 and the like. Thus, the light output from the light source 604 is modulated by the optical modulator 400, becomes modulated light, and is output from the optical transmission apparatus 600.

Since the optical transmission apparatus 600 having the above configuration is configured by using the optical modulation element 404 which is any of the optical modulation elements 100, 100-1, 100-2 having a configuration capable of effectively preventing the scattering loss of the waveguide light due to the surface roughness in the protruding optical waveguide, it is possible to achieve good light transmission by a modulation operation with low optical loss and a low drive voltage, similarly to the optical modulator 400 according to the second embodiment and the optical modulation module 500 according to the third embodiment described above.

The present invention is not limited to the configuration of the above embodiment and its alternative configuration, and can be implemented in various embodiments without departing from the gist thereof.

For example, the optical waveguide 104 is a convex waveguide in the above-described embodiment, but may be a planar waveguide formed on the surface of the substrate 102, for example, a Ti diffused waveguide. Even in this case, the scattering loss due to the roughness of the surface of the substrate 102 can be reduced by the dielectric layer 160.

Further, although the working electrode 114 of the optical modulation element 100 is configured in two stages in the above-described embodiment, it may be configured in a stepped shape having three or more stages.

Further, in the configuration shown in FIG. 4, the dielectric layer 160 is disposed to partially cover the first-stage electrodes 146a, 146b, and 146c of the signal electrode 114-1d and the ground electrodes 114-2d and 114-2e, but the range in which the dielectric layer 160 covers these working electrodes 114 is not limited to the first-stage electrodes 146.

As long as the dielectric layer 160 extends to the edge 144 of the working electrode 114, facing (or adjacent to) the parallel waveguide 112, the dielectric layer 160 may extend to the second-stage electrodes 148 of the working electrodes 114 (alternatively, when these electrodes has three or more stages, the dielectric layer 160 may extend to the second or higher staircase portion).

However, from the viewpoint of concentrating the electric field on the parallel waveguide 112, it is preferable that the dielectric layer 160 partially covers only the first-stage electrodes 146 of the working electrodes 114, and the clearances between the respective second-stage electrodes 148 and the dielectric layer 160 (for example, the clearances W16 and W17 in FIG. 4) are empty.

Further, it is assumed that in the optical modulation element 100, with respect to not only the working electrode 114 but also the bias electrode 130, the dielectric layer 160 covering the parallel waveguide 112 extends to the edges 152 of the two bias electrodes 130 sandwiching the parallel waveguide 112 to partially cover the bias electrode 130. However, such a configuration of the dielectric layer 160 may be implemented for either the working electrode 114 or the bias electrode 130. Thereby, in the working electrode 114 or the bias electrode 130, it is possible to effectively prevent the scattering loss of the waveguide light due to the surface roughness in the optical waveguide while maintaining the high electric field efficiency.

The present invention is not limited to the configuration of the above embodiment, and can be implemented in various embodiments without departing from the gist thereof.

For example, in the optical modulation element 100 shown in FIG. 1, there is a portion of the substrate 102 on which no electrode and optical waveguide 104 are formed, but all or a part of such a portion may be covered with a ground pattern, according to the related art.

As described above, the optical modulation element 100, which is the optical waveguide device according to the above-described embodiment, has a substrate 102 and an optical waveguide 104 formed on the substrate 102. Here, the optical waveguide 104 includes, for example, a parallel waveguide 112 as a part. The optical modulation element 100 includes two electrodes (two working electrodes 114 or two bias electrode 130) disposed at positions sandwiching the parallel waveguide 112 from both sides in the plane of the substrate 102, and a dielectric layer 160 covering a top of the optical waveguide. Then, in the optical modulation element 100, the dielectric layer 160 extends to an extent including the edges of the two electrodes, facing the parallel waveguide 112, in the width direction of the parallel waveguide 112, and is disposed to partially cover each of the two electrodes.

According to this configuration, even when the formation position of the dielectric layer 160 covering the optical waveguide 104 is deviated, the dielectric layer 160 can be formed without a gap between the above two electrodes (that is, the two working electrodes 114 or the two bias electrodes 130) sandwiching the parallel waveguide 112. According to the above configuration, it is possible to effectively prevent the scattering loss of the waveguide light due to the surface roughness of the optical waveguide 104 while maintaining the high electric field efficiency.

Further, in the optical modulation element 100, the optical waveguide 104 is a protruding optical waveguide including a protruding portion extending on the substrate 102. According to this configuration, in a protruding optical waveguide in which roughness is likely to occur on the side surface, it is possible to effectively prevent scattering loss of waveguide light due to the surface roughness of the optical waveguide 104, while maintaining high electric field efficiency.

Further, the refractive index of the dielectric layer 160 is 0.5 times or more and 0.75 times or less the refractive index of the core portion of the optical waveguide 104 through which light propagates. According to this configuration, the trade-off between the decrease in the scattering loss and the increase in the waveguide loss in the optical waveguide 104 can be balanced, and the optical propagation loss of the optical waveguide 104 can be maintained low.

Further, the dielectric layer 160 is, for example, a resin. According to this configuration, since the dielectric layer 160 can be formed as thick as about 10 μm on the optical waveguide 104, for example, the dielectric layer 160 can be easily formed between two electrodes sandwiching the parallel waveguide 112 which is a part of the optical waveguide 104.

Further, the height of the dielectric layer 160 between the two electrodes sandwiching the parallel waveguide 112, which is an optical waveguide 104, is lower than the height of the portion covering these electrodes. According to this configuration, since the electric field generated by the above two electrodes can be concentrated on the optical waveguide 104 covered with the dielectric layer 160, the electric field efficiency is increased and the operating voltage of the optical modulation element 100 can be reduced.

Further, the two working electrodes 114 sandwiching the parallel waveguide 112, which is the optical waveguide 104, are configured as, for example, two stage electrodes so as to be stepped thick as a distance from the parallel waveguide 112 increases. Then, the dielectric layer 160 extends to an extent including the edge of the first-stage electrode 146 of each of the two working electrodes closest to the parallel waveguide 112, in the width direction of the parallel waveguide 112, and is disposed to partially cover each of the two electrodes. According to this configuration, the electric field is concentrated on the parallel waveguide 112 covered with the dielectric layer 160 between the first-stage electrodes 146, and as a result of improving the electric field efficiency, the operating voltage of the optical modulation element 100 is reduced.

Further, the dielectric layer 160 is disposed to partially cover each of the first-stage electrodes 146 of the two working electrodes 114 that sandwich the parallel waveguide 112. According to this configuration, the electric field concentration on the parallel waveguide 112 can be further increased, and the operating voltage of the optical modulation element 100 can be further reduced.

Further, the clearance between the edges 144 of the two working electrodes 114 sandwiching the parallel waveguide 112 is less than 10 μm. According to this configuration, in a configuration in which the working electrodes 114 are disposed at clearance of less than 10 μm, the dielectric layer 160 can be appropriately disposed without deviation in the parallel waveguide 112 disposed between the adjacent working electrodes 114. As a result, the scattering loss in the parallel waveguide 112 can be reduced, and the optical modulation element 100 with low loss can be realized.

Further, the optical waveguide 104 configures two parallel waveguides 112 of each Mach-Zehnder type optical waveguides 110. According to this configuration, in the Mach-Zehnder type optical waveguide 110 in which the difference in optical loss in the two parallel waveguides 112 is easily to affect the optical characteristics, the scattering loss due to the surface roughness in these two parallel waveguides 112 is reduced to achieve good optical characteristics.

Further, the optical modulator 400 according to the second embodiment described above includes an optical modulation element 404 which is an optical modulation element 100, 100-1 or 100-2 that modulates light, a case 402 that houses the optical modulation element 404, an input optical fiber 414 that inputs light to the optical modulation element 404, and an output optical fiber 420 that guides the light output by the optical modulation element 100 to the outside of the case 402.

Further, the optical modulation module 500 according to the third embodiment described above includes an optical modulation element 404, a case 402 that houses the optical modulation element 404, an input optical fiber 414 that inputs light to the optical modulation element 404, an output optical fiber 420 that guides the light output by the optical modulation element 404 to the outside of the case 402, and a drive circuit 508 that drives the optical modulation element.

Further, the optical transmission apparatus 600 according to the fourth embodiment described above includes the optical modulator 400 according to the second embodiment or the optical modulation module 500 according to the third embodiment, and a modulation signal generation unit 608 which is an electronic circuit for generating an electrical signal for causing the optical modulation element 404 to perform a modulation operation.

According to these configurations, it is possible to achieve an optical modulator 400, an optical modulation module 500, or an optical transmission apparatus 600 having low power consumption and low loss.

What is claimed is:

1. An optical waveguide device comprising:
   a substrate;
   an optical waveguide formed on an upper surface of the substrate;
   two electrodes disposed at positions sandwiching the optical waveguide from both sides in a plane of the substrate; and
   a dielectric layer covering a top surface of the optical waveguide, wherein
   each of the two electrodes includes a first stage electrode disposed on the upper surface of the substrate and a second stage electrode disposed on an upper surface of the first stage electrode, the first stage electrode and the second stage electrode are formed in a stepped shape in which the first stage electrode is wider than the second stage electrode in a width direction of the optical waveguide,
   the dielectric layer extends to an extent including edges of the two electrodes, facing the optical waveguide, in the width direction of the optical waveguide, and is disposed to partially cover the upper surface of each of the first stage electrodes, and
   a gap is formed between the dielectric layer and each of the second stage electrodes in the width direction of the optical waveguide.

2. The optical waveguide device according to claim 1, wherein
   the optical waveguide is a protruding optical waveguide including a protruding portion extending on the substrate.

3. The optical waveguide device according to claim 1, wherein
   a refractive index of the dielectric layer is 0.5 times or more and 0.75 times or less a refractive index of a core portion of the optical waveguide through which light propagates.

4. The optical waveguide device according to claim 1, wherein
a height of the dielectric layer between the two electrodes is lower than a height of a portion covering the electrodes.

5. The optical waveguide device according to claim 1, wherein
the dielectric layer is a resin.

6. The optical waveguide device according to claim 1, wherein
a clearance between the edges of the two electrodes is less than 10 μm.

7. The optical waveguide device according to claim 1, wherein
the optical waveguide configures two parallel waveguides of a Mach-Zehnder type optical waveguide.

8. An optical modulator comprising:
the optical waveguide device according to claim 1, which is an optical modulation element that modulates light;
a case that houses the optical waveguide device;
an optical fiber that inputs light to the optical waveguide device; and
an optical fiber that guides light output by the optical waveguide device to outside of the case.

9. An optical transmission apparatus comprising:
the optical modulator according to claim 8; and
an electronic circuit that generates an electrical signal for causing the optical waveguide device to perform a modulation operation.

10. An optical modulation module comprising:
the optical waveguide device according to claim 1, which is an optical modulation element that modulates light;
a case that houses the optical waveguide device;
an optical fiber that inputs light to the optical waveguide device;
an optical fiber that guides light output by the optical waveguide device to outside of the case; and
a drive circuit that drives the optical waveguide device.

11. An optical transmission apparatus comprising:
the optical modulation module according to claim 10; and
an electronic circuit that generates an electrical signal for causing the optical waveguide device to perform a modulation operation.

* * * * *